3,442,687
VAPOR-IMPERMEABLE COATED POLYOLEFIN SUBSTRATES
Lamont Hagan, Guilford, Conn., assignor to National Distillers and Chemical Corporation, New York, N.Y., a corporation of Virginia
No Drawing. Filed Dec. 8, 1965, Ser. No. 512,550
Int. Cl. B44d 1/22
U.S. Cl. 117—72        5 Claims

ABSTRACT OF THE DISCLOSURE

Polyolefin articles having an improved vapor-impermeable vinylidene chloride interpolymer coating are produced by a process comprising applying a solution of a vinylidene chloride to a polyolefin substrate to which has been applied an intermediate coating of an ethylene-vinyl acetate copolymer.

---

This invention relates to a method for forming vapor-impermeable vinylidene chloride interpolymer coatings on polyolefin substrates, and to polyolefin films and other articles thus coated.

In the following specification, all parts and percentages are given by weight unless otherwise indicated.

Interpolymers of vinylidene chloride, which are commercially available under the trademark "Saran," for example, have been employed in coatings for various films to impart fluid impermeability thereto. It is particularly desirable to provide such coatings on polyolefin films or other substrates, since such materials, while effective moisture barriers, are not vapor-impermeable. However, vinylidene chloride interpolymer-containing coatings capable of acting as vapor barriers do not readily adhere to polyethylene or polypropylene films, for example, whether or not such films are previously subjected to conventional electrical discharge pre-treatment. To adhere such coatings to polyolefin substrates, it is necessary to utilize primer coatings designed to adhere to both the polyolefin substrate and the vinylidene chloride coating therefor.

Various procedures have been proposed for adhering vinylidene chloride interpolymer coatings to polyolefin substrates, utilizing various primer coats. One such procedure is described in copending application Ser. No. 467,715 filed on June 28, 1965 and assigned to the owner of the present invention.

It is among the objects of the present invention to provide a further method for the formation of vapor-impermeable vinylidene chloride interpolymer coatings on polyolefin substrates, together with the thus coated polyolefin materials.

A further object of the invention is to provide such a method by which vinylidene chloride interpolymers may be adhered to polyolefin substrates without the necessity of subjecting such substrates to electrical discharge pre-treatment.

Other objects and advantages of the present invention will be apparent from a consideration of the following description.

A vapor-impermeable vinylidene chloride interpolymer coating is formed on a polyolefin substrate, in accordance with the present invention, by initially applying a continuous coating of an ethylene-vinyl acetate copolymer to the substrate, thereafter applying a solution of the vinylidene chloride interpolymer in an inert organic solvent to the ethylene-vinyl acetate coating, and finally evaporating the solvent to leave the desired continuous, vapor-impermeable vinylidene chloride polymer coating upon the substrate. The initial continuous coating of ethylene-vinyl acetatae may be directly applied to the polyolefin substrate, without the necessity for an electrical discharge pre-treatment, such as is conventionally employed to improve the adhesion of coatings to polyolefin materials. The organic solvent solution of the vinylidene chloride interpolymer firmly adheres to the ethylene-vinyl acetate coating upon drying, providing an excellent high vapor barrier on the polyolefin.

Both the vinylidene chloride interpolymer coating and the underlying ethylene-vinyl acetate coating may incorporate any desired additives, including dyes or other colorants to impart desired tones to the polyolefin article. Other useful additives may be incorporated in the vinylidene chloride interpolymer coating, as described more fully hereinafter.

The polyolefin substrates treated in accordance with the present invention may be in any desired form, e.g., as a film, sheet, bottle or other blown article, pipe, tube, or the like. Similarly, the article may consist of a laminate of several mataerials, the outer surface of which constitutes a polyolefin substrate to be rendered vapor-impermeable.

The polyolefin article, e.g., polyethylene or polypropylene, may be coated on one or more sides, depending upon the configuration of the article and its intended utility. Where, for example, it is desired to form a vapor-impermeable coating on a polyolefin bottle to prevent escape of highly volatile material, it is sufficient to form the vinylidene chloride interpolymer coating of the present invention on the interior surfaces of such bottle.

The ethylene-vinyl acetate coating initially provided on the polyolefin substrate may be formed from mixtures of from about 50% to 90%, preferably from 70% to 85%, ethylene, and from about 10% to 50%, preferably from 15% to 30%, vinyl acetate. The copolymer composition is provided on the polyolefin substrate in any desired thickness, it being sufficient that a continuous coating of the copolymer be provided on the area on which the vinylidene chloride polymer is to be formed.

The ethylene-vinyl acetate copolymer coating initially provided on the polyolefin substrate may be formed thereon in any desired manner. Hence, polyolefin film bases may be thus coated by any of the conventional dipping, doctoring, spraying, gravure coating, or like operations to form the desired continuous ethylene-vinyl acetate coating thereon. Blown articles having such coatings may be produced, for example, by spraying or co-extruding operations.

The vinylidene chloride interpolymers coated atop the ethylene-vinyl acetate sub-layer include those polymers of vinylidene chloride which have high vapor barrier characteristics, and which do not contain amounts of co-monomer or monomers sufficient to interfere with the solvent solubility of the resulting interpolymer. Suitable materials contain from about 70% to 95%, preferably from 80% to 92%, vinylidene chloride, and from about 5% to 30%, preferably from 8% to 20%, of one or more monomers copolymerizable therewith. Monomers so useful include various vinyl materials, e.g., vinyl chloride, acrylonitrile, methacrylonitrile, acrylic acid esters, methacrylic acid esters, maleic acid esters, fumaric acid esters, or itaconic acid esters, the alcoholic moieties of which esters contain from 1 to 6 carbon atoms and preferably not more than 4 carbon atoms; other applicable vinyl co-monomers include methylvinyl ketone, vinyl acetate and other vinyl esters, styrene, dichlorovinylidene fluoride, butadiene, chlorobutadiene, isoprene or vinylpyridine.

The vinylidene chloride interpolymer is deposited from a suitable organic solvent which is inert with respect to the polymeric material and the underlying strata. Solvents which have been found useful in accordance with the practice of this invention include lower aliphatic ketones such as acetone, methylethyl ketone (alone or in admixture with toluene), or methyl i-butyl ketone; cycloaliphatic ketones such as cyclohexanone; tetrahydrofuran; or the like.

The solids content of the organic solvent solution of the vinylidene chloride interpolymer is correlated with the mechanical parameters of the coating operation to regulate the desired coating weight. It is sufficient to utilize solutions having solids contents such that a continuous coating of the vinylidene chloride interpolymer is formed upon the polyolefin substrate. In the case of polymer solutions in tetrahydrofuran, for example, solids contents varying from about 10% to 30% may conveniently be employed with the solution being applied at ambient temperatures. Alternatively, when tetrahydrofuran solutions of the vinylidene chloride interpolymers are heated, concurrently decreasing the viscosity thereof, solutions having solids contents as high as about 50% may be employed in the coating operations, depending upon the working viscosities and handling temperatures to be utilized.

The vinylidene chloride interpolymer coatings may be of any desired thickness, it being sufficient that a continuous layer or film of the vinylidene chloride interpolymer is formed upon the polyolefin substrate. It is sufficient to provide coatings having thicknesses such that from as little as 1 gram to as much as 10 grams of the polymeric coating are uniformly spread over each thousand square inches of the polyolefin substrate.

As in the case of the initial ethylene-vinyl acetate copolymer coating, the vinylidene chloride interpolymer may be deposited upon the polyolefin substrate in any desired manner. The coating operations may thus be conducted by dipping, doctoring, spraying, gravure coating, or other desired procedures, either at ambient temperatures or up to temperatures as high as about 50° to 60° C.

The polyvinylidene chloride coating is dried to evaporate the greater part of the solvent medium and thereby reduce the solvent content to a tolerable level, e.g., no more than about 1000 parts per million. The solvent evaporation or drying operation is suitably conducted at temperatures in excess of about 90° F., up to the maximum temperature which the polyolefin substrate can withstand. Adequate drying has been effected utilizing drying temperatures varying from about 150° F. to as high as 300° F., preferably from about 185° to 225° F.

As noted hereinabove, the vinylidene chloride interpolymer coating may additionally contain other additives. Thus, either solvent-soluble or oil-soluble dyes may be admixed with the coating solution, e.g., in amounts of about 10% by weight of the solution, to impart desired coloration to the polyolefin article. Alternatively, known antiblocking agents, e.g., polyethylene, carnauba wax, aluminum silicate, or the like anti-fogging agents; or anti-static agents, may thus be included in the vinylidene chloride interpolymer-containing solution applied to the polyolefin substrate.

A preferred embodiment illustrating the conditions for carrying out the method and for producing the product of the present invention is set forth below:

EXAMPLE

A 10% solution of a vinylidene chloride-acrylonitrile copolymer (90% vinylidene chloride, 10% acrylonitrile) in tetrahydrofuran was provided. A solvent-soluble yellow dye (Oil Yellow 2681, a product of Allied Chemical Corporation, National Aniline Division) was dissolved in the amount of 10% by weight of the solution.

Three blown test bottles were provided for coating. The first bottle was constituted of polypropylene having an internal coating of an ethylene-vinyl acetate copolymer (about 85% ethylene–15% vinyl acetate). The second bottle was constituted of polypropylene without any inside coating. The third bottle was constituted of reclaimed high density polyethylene without any internal coating.

100 ml. of the above solution was poured into each of the bottles, the bottles corked and shaken and upended several times. The solutions were thereafter poured out of the bottles and the bottles permitted to drain. The tetrahydrofuran solvent was thereafter removed by blowing hot air through the bottles.

It was found that a continuous, uniform coating of the vinylidene chloride copolymer was solely produced within the bottle bearing the ethylene-vinyl acetate internal coating. On the following day, the thus coated bottle was cut open and it was found that the vinylidene chloride polymer coating firmly adhered to the polyolfin substrate and could not be removed therefrom even when cross-hatched with a knife edge and contacted with a cellophane base adhesive tape.

It will be apparent that, in accordance with the present invention, vinylidene chloride interpolymer coatings may be firmly adhered to polyolefin substrates without resorting to the conventional electrical discharge pretreatment of a substrate.

I claim:

1. In a method for forming a vapor-impermeable vinylidene chloride interpolymer coating on a polyolefin substrate, the improvement which comprises:

(a) applying to said substrate a continuous coating of an ethylene-vinyl acetate copolymer formed from a mixture of from 50 to 90 weight percent ethylene and from 10 to 50 weight percent vinyl acetate;

(b) applying to said coating a solution, in an inert organic solvent, of a vinylidene chloride interpolymer formed from a mixture of from 70 to 95 weight percent vinylidene chloride and from 5 to 30 weight percent of a monomer copolymerizable therewith; and (c) evaporating said solvent to leave a continuous, vapor-impermeable vinylidene chloride interpolymer coating upon said substrate.

2. The method of claim 1, in which said polyolefin substrate comprises polypropylene, and in which the vinylidene chloride interpolymer comprises a copolymer of from 80 to 92 weight percent vinylidene chloride with from 8 to 20 weight percent acrylonitrile, said copolymer being applied to the substrate in step (b) in a solution of tetrahydrofuran having a solids concentration of up to 30 percent by weight.

3. The method of claim 1, in which the organic solvent comprises a member of the group consisting of lower aliphatic ketones, cycloaliphatic ketones, tetrahydrofuran, and mixtures thereof.

4. A polyolefin article having a vapor-impermeable vinylidene chloride interpolymer coating adhered thereto, which comprises:

(a) a polyolefin substrate;

(b) a continuous coating of a copolymer of 50 to 90 weight percent ethylene and 10 to 50 weight percent vinyl acetate on said substrate; and, (c) deposited upon and adhered to said ethylene-vinyl acetate copolymer coating, a continuous coating of a vapor-impermeable interpolymer of 70 to 95 weight percent vinylidene chloride and 5 to 30 weight percent of a monomer copolymerizable therewith.

5. The polyolefin article of claim 4, in which said polyolefin substrate comprises polypropylene, and the vapor impermeable vinylidene chloride interpolymer coating adhered thereto is constituted of a vinylidene chloride-acrylonitrile copolymer.

References Cited

UNITED STATES PATENTS

| | | |
|---|---|---|
| 3,134,684 | 5/1964 | Northrop et al. |
| 3,285,766 | 11/1966 | Barkis et al. |
| 3,353,991 | 11/1967 | Shelburg et al. |

WILLIAM D. MARTIN, *Primary Examiner.*

R. HUSACK, *Assistant Examiner.*

U.S. Cl X.R.

117—76, 92, 138.8